United States Patent [19]

Van Sickle et al.

[11] Patent Number: 4,788,772

[45] Date of Patent: Dec. 6, 1988

[54] DIMENSIONING HEAD FOR PLUG GAGE

[75] Inventors: Richard G. Van Sickle, Sterling Heights; George Bour, Holly, both of Mich.

[73] Assignee: GTE Valeron Corporation, Troy, Mich.

[21] Appl. No.: 39,409

[22] Filed: Apr. 17, 1987

[51] Int. Cl.$^4$ .............................................. G01B 5/12
[52] U.S. Cl. ................................ 33/178 R; 33/147 K
[58] Field of Search .......................... 33/147 K, 178 R

[56] References Cited

U.S. PATENT DOCUMENTS

| | | | |
|---|---|---|---|
| 1,797,122 | 3/1931 | Bohn | 33/167 |
| 2,344,595 | 3/1944 | Calow | 33/167 |
| 2,587,059 | 2/1952 | Bishop | 33/178 R |
| 2,702,946 | 3/1955 | Boat | 33/178 R |
| 2,799,092 | 7/1957 | Abramson | 33/147 K |
| 2,842,858 | 7/1958 | Mennesson | 33/178 R |
| 2,968,102 | 1/1961 | Raifsnider | 33/178 R |
| 3,343,270 | 9/1967 | Eisele | 33/178 R |
| 4,058,901 | 11/1977 | Lendi et al. | |

FOREIGN PATENT DOCUMENTS 142088 4/1980 Fed. Rep. of Germany .

Primary Examiner—Harry N. Haroian
Attorney, Agent, or Firm—Robert E. Walter

[57] ABSTRACT

In a dimensioning head for a plug gage, a pair of exteriorly projecting balls project through openings on either side of the longitudinal axis of the housing for contacting the inside diameter of the bore hole to be measured. Each of the balls contact a V-shaped groove of a guide surface to the housing to ensure accuracy and repeatability of measurements.

1 Claim, 1 Drawing Sheet

DIMENSIONING HEAD FOR PLUG GAGE

Copending related applications are Ser. No. 07/039,410, filed Apr. 17, 1987 and entitled "Plug Gage" and Ser. No. 07/039,408, filed Apr. 17, 1987, entitled "Plug Gage".

FIELD OF THE INVENTION

The present invention relates to plug gages of the type comprising a plurality of balls which move in the direction perpendicular to the longitudinal axis of the plug gage as the surfaces to be dimensioned are contacted. The transverse motion of the balls is transmitted to a movement along the axial direction by contact with a gaging member having an axial alignment to give an accurate reading of dimensions being measured.

BACKGROUND OF THE INVENTION

A prior art plug gage is disclosed in U.S. Pat. No. 4,058,901 to Lendi et al. The plug gage disclosed utilizes balls to engage the surfaces to be dimensioned. The three balls are housed by crimping in a guide channel which passes through the wall of a housing. Within the housing, the balls rest against a conical part which is centered on the axis of the housing. As the balls move inwardly during dimensioning, the conical part is urged upwardly. A rod connected to the conical part transmits axial movement to a transducer system such as an electronic sensor or a comparator. With this system, a slight rotation of the conical part results in different surface portions being presented to the balls. If the conical part is imprecisely machined, surface deviations may affect the repeatability and accuracy of measurements.

SUMMARY OF THE INVENTION

It is an object of the present invention to provide a dimensioning head for a gage which is highly accurate due to simplicity of construction and the presence of precision machined guide surfaces in contact with the sensing balls. It is a further object to have the balls follow the same path, i.e. lines of contact with the surfaces, to assure accuracy and repeatabilty of the gage. It is a further object to obviate one or more disadvantages of the prior art.

In accordance with the present invention, there is provided a dimensioning head for a plug gage comprising an elongated housing with a longitudinal axis having an open end and a closed end. A gaging member is mounted in the housing for movement along the longitudinal axis. The gaging member includes a wedging portion normally biased toward the closed end of the housing and a gage engaging portion projecting toward the open end of the housing. A pair of balls are adapted to contact surfaces to be dimensioned exterior to the housing. The housing includes a pair of stationary guide surfaces and the wedging portion includes a pair of movable guide surfaces. Each of the movable guide surfaces converge toward the closed end at a predetermined angle to the longitudinal axis. In accordance with the present invention, the movable guide surfaces are in the form of a V-shaped groove for contacting a respective ball. The V-shaped groove results in parallel lines of contact being presented to the balls insure the accuracy and repeatability of the gage. The stationary guide surfaces are planar so as to present a single line of contact to the respective balls.

IN THE DRAWINGS

DETAILED DESCRIPTION OF THE PREFERRED EMBODIMENT

Figure 1:
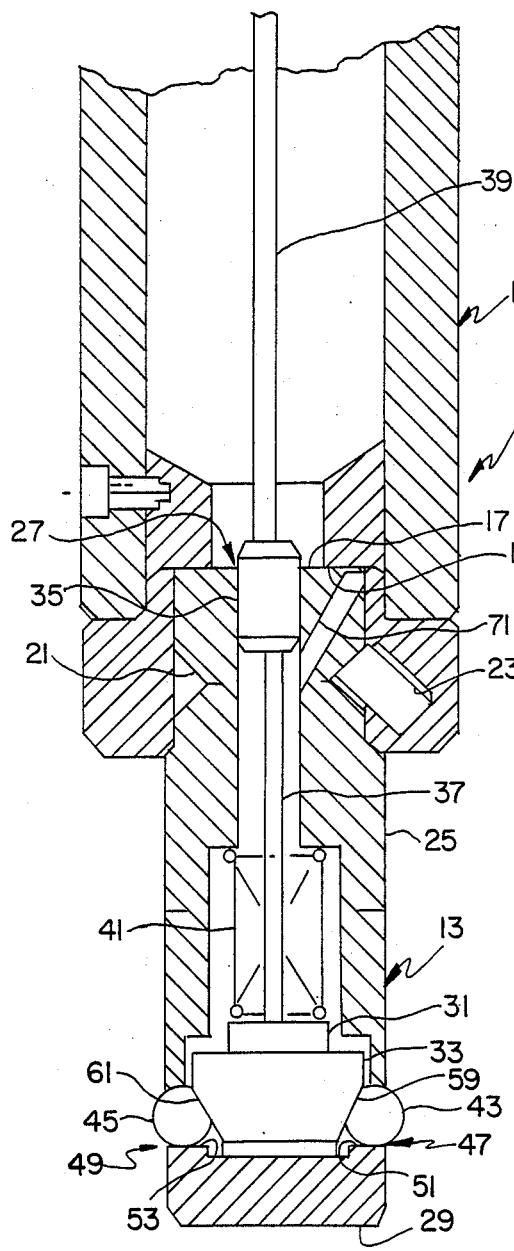
FIG. 1 is side view in section illustrating mounting of the dimensioning head to a detector.

As illustrated in FIG. 1 the plug gage, generally indicated at 11, includes a dimensioning head 13 coupled to detector 15 so that the respective longitudinal axis are in alignment. The detector 15 is provided as an indicating device, such as by a dial or any other type of indicator that can measure axial movement and translate the axial movement to a reading indicative of distances measured.

The dimensioned head 13 includes a forwardly facing surface 17 which abuts a rearwardly facing surface 19 on the indicating device. The complementary surfaces 17, 19 which are preferably planer lie in a direction transverse to the axial direction. The dimensioning head 13 which has a tubularly shaped housing includes a circumferential annular groove 21 having a V-shaped cross section. The outer portion of the detector 15 overlaps the dimensioning head 13 and includes a set screw 23 inclined upwardly for engaging the V-groove. Preferably the detector 15 is provided with at least two set screws which urge the complement surfaces 17, 19 in contact so that axial alignment of the detector 15, and the dimensioning head 13 is maintained during operation of the gage 11. The mating as provided in the present invention permits rotation of the dimensioning head 13 with respect to the detector 15 while maintaining axial alignment. The coupling provided by the present invention results in an easily detachable dimensioning head 13 so that various size heads can be used depending on the opening to be measured.

The dimensioning head 13 comprising a housing 25 elongated along the longitudinal axis and having an open end 27 and a closed end 29. A gaging member 31 is mounted in the housing 25 for movement in the direction of the longitudinal axis. The gaging member 31 has a wedging portion 33 normally biased toward the closed 29 end of the housing 25 and a detector engaging portion 35 projecting toward the open end 27. As illustrated in FIG. 1, the detector engaging portion 35 is in the form of an axially aligned rod 37 which is connected to the wedging portion 33. Thus, axial motion is transmitted directly from the wedging portion 33 by the rod 37 to an abutting rod 39 associated with the detector 15. The wedging portion 33 of the gaging member 31 is normally biased in a downward axial direction away from the detector 15 by a spring 41 mounted between the housing 25 and the wedging portion 33.

A pair of balls 43 45 are adapted to contact surfaces to be dimensioned exterior to the housing 25. The housing 25 has a pair of openings 47, 49 substantially in alignment in a direction transverse to the longitudinal axis for retaining said balls 43, 45 in contact with said wedging portion 33. In a rest position, the balls 43, 45 are urged outwardly by the wedging portion 33. The outward movement of the balls 43, 45 away from the longitudinal axis is restrained by the openings 47, 49 in the housing 25. Each opening 47, 49 has dimension smaller than the diameter of a respective ball 43, 45. Preferably the cross section of the openings 47, 49 decrease from the inside wall of the housing 25 to the outside wall so that the small dimension is adjacent the exterior. This construction maximizes the outward projection of the balls 43, 45. Typically the respective openings 47, 49 form circular tapered seats for the balls 43, 45. As the balls 43, 45 engage respective exterior surfaces during the gaging process, they move inwardly away from the tapered seats or openings 47, 49.

The movement of the balls 43, 45 is so restrained during gaging that ball movement is in a direction perpendicular to the longitudinal axis and preferably along a straight line. To achieve the desired straight line movement in a direction perpendicular to the longitudinal axis, each ball is restrained by a respective pair of guide surfaces 51, 53. A first pair of guide surfaces 51, 53 are so configured so as to present a line of contact with a respective ball. The second pair of guide surfaces 59, 61 is configured as to present a V-shaped groove with respect to a ball. The use of a V-groove aids in assuring straight line motion of the balls 43, 45 along the same path. For each ball, one guide surface is positioned in a direction transverse to the longitudinal axis and the other guide surface is associated with the wedging portion 33. The guide surfaces 51, 53 associated with the housing 25 are stationary. The guide surfaces 59, 61 associated with the wedging portion 33 are an intergral part of the wedging portion 33 and move as the wedging portion 33 moves.

Figure 2:
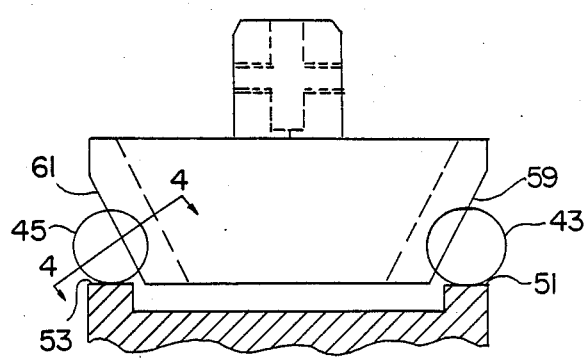
FIG. 2 is a side view of the wedging portion of the gaging member.

The wedging portion 33 has a pair of parallel face surfaces 55, 57 and a pair of movable guide or ball contacting end surfaces 59, 61 intermediate the face surfaces 55, 57 and disposed on either side of its axis. As illustrated in FIG. 2, when the wedging, portion 33 is mounted in the housing 25, its axis corresponds to the longitudinal axis of the housing 25. Preferably the interior of the housing 25 includes a partition (not shown) which projects on either side of wedging member 33 closely adjacent a respective face surface 55, 57 so as to prevent rotation. Such rotation may be caused by an exterior force acting on the wedging portion 33 and might tend to unseat the balls 43, 45. Each of the movable guide surfaces 59, 61 converge toward the closed end of the housing 25 at a predetermined angle to the longitudinal axis of the elongated housing 25.

As the balls 43, 45 move inwardly during dimensioning, they are wedged between the opposing stationary 51, 53 and movable 59, 61 guide surfaces. The movable guide surfaces 59, 61 associated with the wedging portion 33 move in proportion to the distance being gauged. Thus, the lateral movement of the respective balls 43, 45 is transmitted to movement in the axial direction through the gaging member 31 to the detector 15. Preferably the movable guide surfaces 59, 61 associated with the wedging member 33 are at about a 24 to 28 degree angle with respect to the longitudinal axis. With the balls 43, 45 moving in a straight line perpendicular to the longitudinal axis, the movement of the wedging member 33 is directly proportional to the movement of balls 43, 45.

Figure 4:
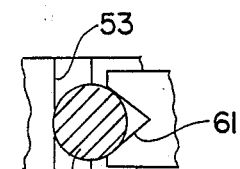
FIG. 4 is a view of the section 4—4 shown in FIG. 2.
Figure 3:
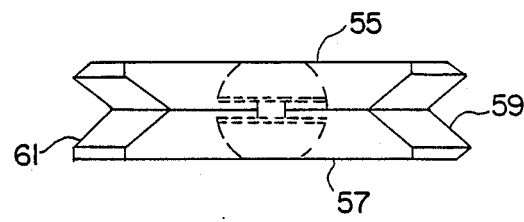
FIG. 3 is a bottom view of the wedging portion shown on FIG. 2.

As illustrated in FIG. 2 the movable guide surfaces 59, 61 are in the form of a V-groove so that parallel line contact is provided to guide a respective ball. These V-grooves are more clearly illustrated in FIGS. 3 and 4. In this case, the wedging member 33 is not free to rotate since the V-groove in contact with a respective ball acts as a restraint on rotational movement. Thus, the same ball contacting points are maintained during dimensioning to assure repeatability and accuracy of any measurement. The stationary guide surface is in the form of a planar surface perpendicular to the longitudinal axis. FIG. 4 which is a sectional view along 4—4 of FIG. 2 illustrates the wedging action created by the ball 45 as it moves inwardly between the respective movable 61 and stationary 53 guide surfaces. An additional feature of this invention is that it permits a reasonable amount of lateral translation of the ball-wedge assembly with respect to the housing without significant cordal or lateral offset error. This is important since the housing must be made smaller than the minimum anticipated part size and cannot be relied upon to exactly center itself on every part. Means also provided for passage of air through assembly for cleaning purposes. As illustrated at 71 in FIG. 1.

We claim:

1. A plug gage of the type comprising a combination dimensioning head and detector, said dimensioning head comprising an elongated cylindrically shaped housing with a longitudinal axis and having an open end and a closed end, a gaging member mounted in said housing for movement along the longitudinal axis, said gaging member being normally biased toward the closed end and having a gage contacting portion projecting toward the open end, a pair of balls adapted to move and contact surfaces to be dimensioned exterior to said housing, said housing having a pair of stationary guide surfaces in alignment along a plane perpendicular to the longitudinal axis, said gaging member having a pair of planar guide surfaces converging toward the closed end at a predetermined angle to the longitudinal axis, each of said guide surfaces being in the form of a V-groove for presenting a pair of parallel lines for contacting a respective ball whereby said gaging member moves toward the open end as said balls are urged inwardly when contacting surfaces exterior to the housing during gaging, said detector comprising a rod aligned along said longitudinal axis and in engagement with said gage contacting portion whereby movement of said gaging member is transmitted to said rod for detecting movement of said balls, said detector further comprising an outer portion overlapping said cylindrically shaped elongated housing, said cylindrically shaped elongated housing having a V-shaped circumferential groove extending entirely around the periphery, said detector including at least one set screw for urging said detector into mating relationship with said dimensioning head whereby said dimensioning head may be adjustably rotated with respect to said detector.

* * * * *